United States Patent [19]

Blom et al.

[11] 3,925,812

[45] Dec. 9, 1975

[54] COLOUR TELEVISION CAMERA INCLUDING A POSITION CORRECTOR FOR AT LEAST TWO SCANNING RASTERS IN THE CAMERA

[75] Inventors: Hendrik Blom; Prudent Eduardus Jacobus Mollet, both of Eindhoven, Netherlands

[73] Assignee: U.S. Philips Corporation, New York, N.Y.

[22] Filed: May 2, 1972

[21] Appl. No.: 249,527

[30] Foreign Application Priority Data

May 6, 1971 Netherlands ....................... 7106184

[52] U.S. Cl. .................................................. 358/51

[51] Int. Cl.[2] ........................................... H04N 9/08

[58] Field of Search .................... 178/5.4 M; 358/51

[56] References Cited

UNITED STATES PATENTS 3,621,122 11/1971 Hipwell .......................... 178/5.4 M

*Primary Examiner*—George H. Libman

*Assistant Examiner*—George G. Stellar

*Attorney, Agent, or Firm*—Frank R. Trifari; Henry I. Steckler

[57] ABSTRACT

A colour television camera including a raster position corrector for two scanning rasters to be registered. In the position corrector the image signals from camera tubes are multiplied after delays and an error signal is generated in case of incorrect registering. The error signal is applied to a store via an integrator having a time constant which is longer than one field period, which store acts on the line field deflection coils through a current and voltage level control circuit, respectively, operative in a static manner. An aperture corrector preferably forms part of the position corrector.

7 Claims, 4 Drawing Figures

Figure 1:
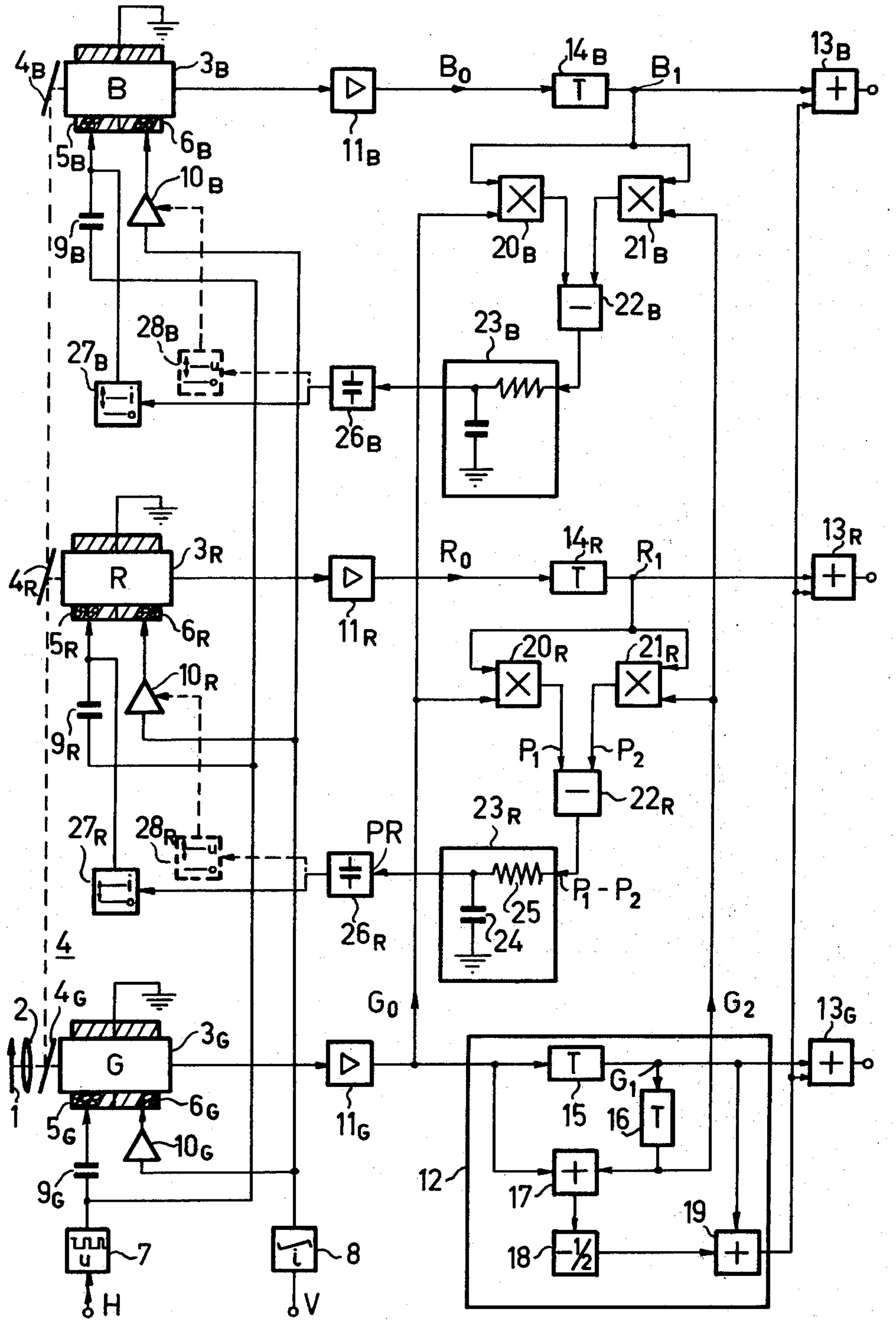

COLOUR TELEVISION CAMERA INCLUDING A POSITION CORRECTOR FOR AT LEAST TWO SCANNING RASTERS IN THE CAMERA

The invention relates to a colour television camera including a position corrector for at least two scanning rasters in the camera, which camera is provided with line and field deflection generators which are connected to deflection means so as to constitute the scanning rasters in a field period with the aid of at least two electron beams generated in the camera so that at least two image signals are generated in the camera, which image signals are applied to the position corrector which is provided with at least a delay circuit for providing an image signal delayed once and twice and at least a multiplier and subtractor stage by which an error signal occurring at a terminal is derived, in case of incorrect registering of the scanning rasters, from the said two image signals occurring undelayed and delayed, which error signal for the purpose of position correction acts on the deflection means for one of the scanning rasters through a store.

Such a colour television camera is proposed in the U.S. Pat. No. 3,621,122. The error signal is generated in the position corrector by means of mutual comparison of slopes occurring in the image signals with one of the image signals considered as a reference signal with the aid of delay circuits, multipliers and a differential amplifier. In case of satisfactory registering of the two scanning rasters the error signal is zero and when the rasters are relatively shifted in one or the other direction the error signal is either positive or negative. The error signal acts on the store and in this on a multiplier incorporated therein whose input is connected through a delay circuit to the output thereof. This multiplier has a multiplication factor of one when the error signal is zero. Dependent on a positive or negative error signal the multiplication factor is either larger or smaller than one. The output of the delay circuit in the store constitutes the output of the position corrector. The position corrector output thus conveys a correction signal which is applied to the deflection means so as to yield an error signal of zero value.

For performing a correction in the line scan direction i.e. horizontal direction, the delay circuits used for the mutual comparison of the image signals have a delay period of one spot period in which a line is considered to comprise a plurality of image spots. The delay circuit in the store has a delay period which is equal to one line period and hence has a frequency passband of up to seven times the line frequency. The result is that the correction signal exhibits a variation over a line period which is derived from a continuous comparison between the image spots and is limited in its frequency range to seven times the line frequency. The correction signal provides a dynamically correcting shift current in the horizontal deflection means formed as coils.

For performing a correction in the field scan direction, i.e. vertical direction the said patent states that not only an adaptation of the delay periods is necessary, namely one line period for the comparison and one field period in the store, but also an additional comparison of the image signals by means of two differential amplifiers is required. The correction signal for the vertical deflection means exhibits variations over one field period to approximately five to ten times the field frequency and a dynamically correcting shift of the vertical deflection signal is the result.

During correction a current variation of approximately seven times the line and field frequencies is introduced into the line and field deflection coils, respectively. Since the coils are proportioned in an optimum manner for the line and field frequencies, the correction performed at a higher frequency is not optimum and is distorted especially in the line deflection coils. It is also generally undesirable to introduce phenomena of a higher frequency into the deflection coils.

An object of the invention is to provide a simpler correction without causing detrimental high-frequency variations in which apart from changed delay periods in the comparison performed the correctors for the horizontal and vertical directions are identical. To this end the colour television camera according to the invention is characterized in that in the position corrector the terminal conveying the error signal provided by the multiplier and subtractor stage is connected to the store through an integrator having a time constant of at least the order of one field period.

It has been proposed to realize a position corrector in which two signal combinations composed of image signals which are either delayed or undelayed are each integrated. Each signal combination occurring after a subtractor stage is applied to an integrator after full-wave rectification for obtaining the module. The two integrators are connected to inputs of a subtractor stage whose output provides the error signal to be applied to the store. For performing a position correction in the vertical direction a sampling technique has been proposed in this respect so as to prevent the use of expensive delay circuits.

The proposal states that the use of a multiplier is not desirable because the multiplication of two signals involves a correlation technique which might create difficulties in the use of video frequency signals. While avoiding signal multiplication the described proposal was made for different, horizontal and vertical position correctors.

However, the present invention is based on the recognition of the fact that for the specific location of the integrator in a position corrected based on signal multiplication a satisfactory and yet simpler solution is obtained.

A solution which is very attractive in connection with the cost aspects is the one in which a camera accoridng to the invention is characterized in that an aperture corrector present in the camera forms part of the position corrector and includes the said delay circuit for providing the image signal delayed twice.

Figure 2:
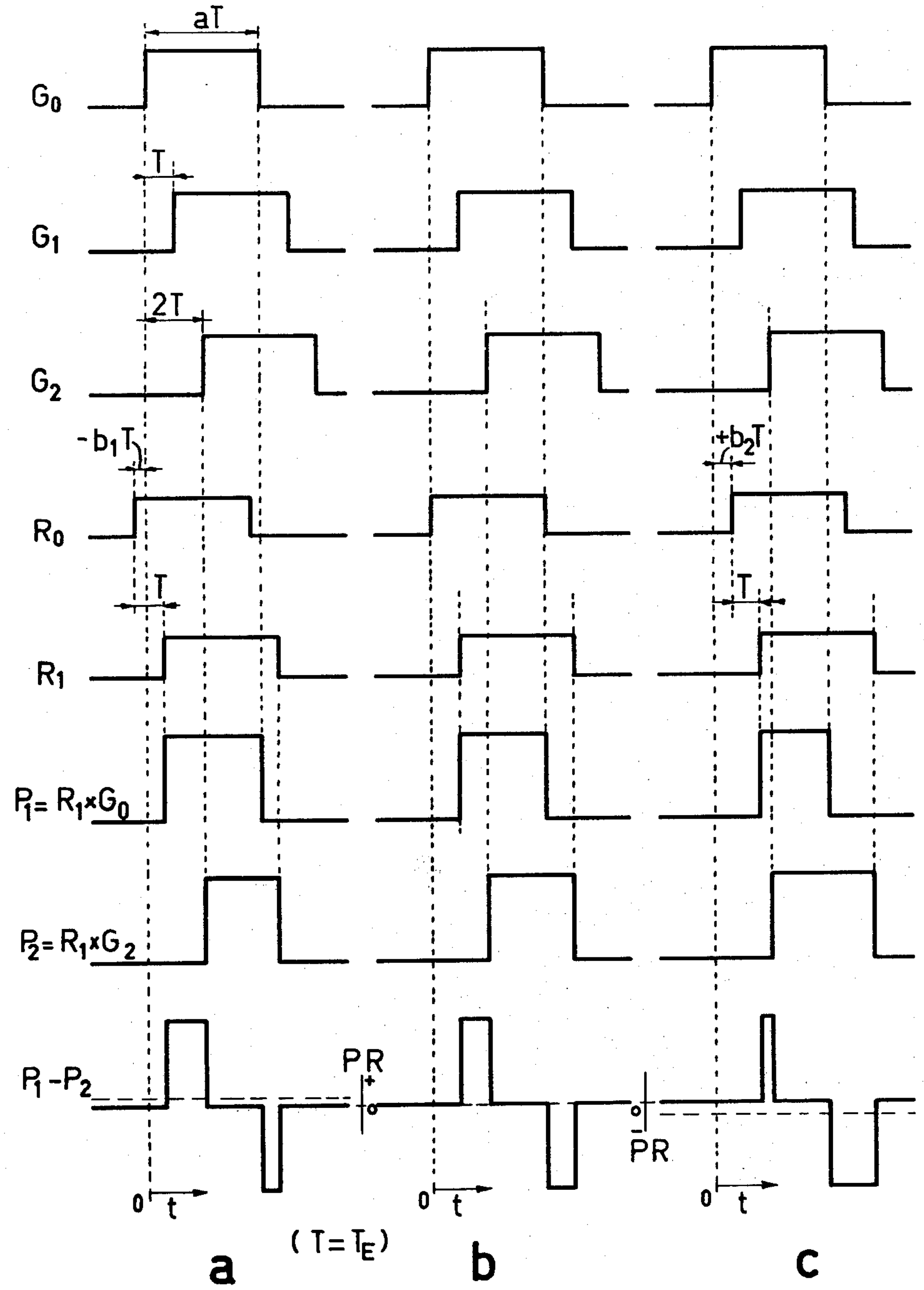

In order that the invention may be readily carried into effect some embodiments thereof will now be described in detail by way of example with reference to the accompanying diagrammatic drawings in which FIG. 1 shows an embodiment of a colour television camera according to the invention, including a raster position corrector, FIG. 2 shows some signals occurring in the camera according to FIG. 1 and associated with a correction in the line scan direction.

Figure 3:
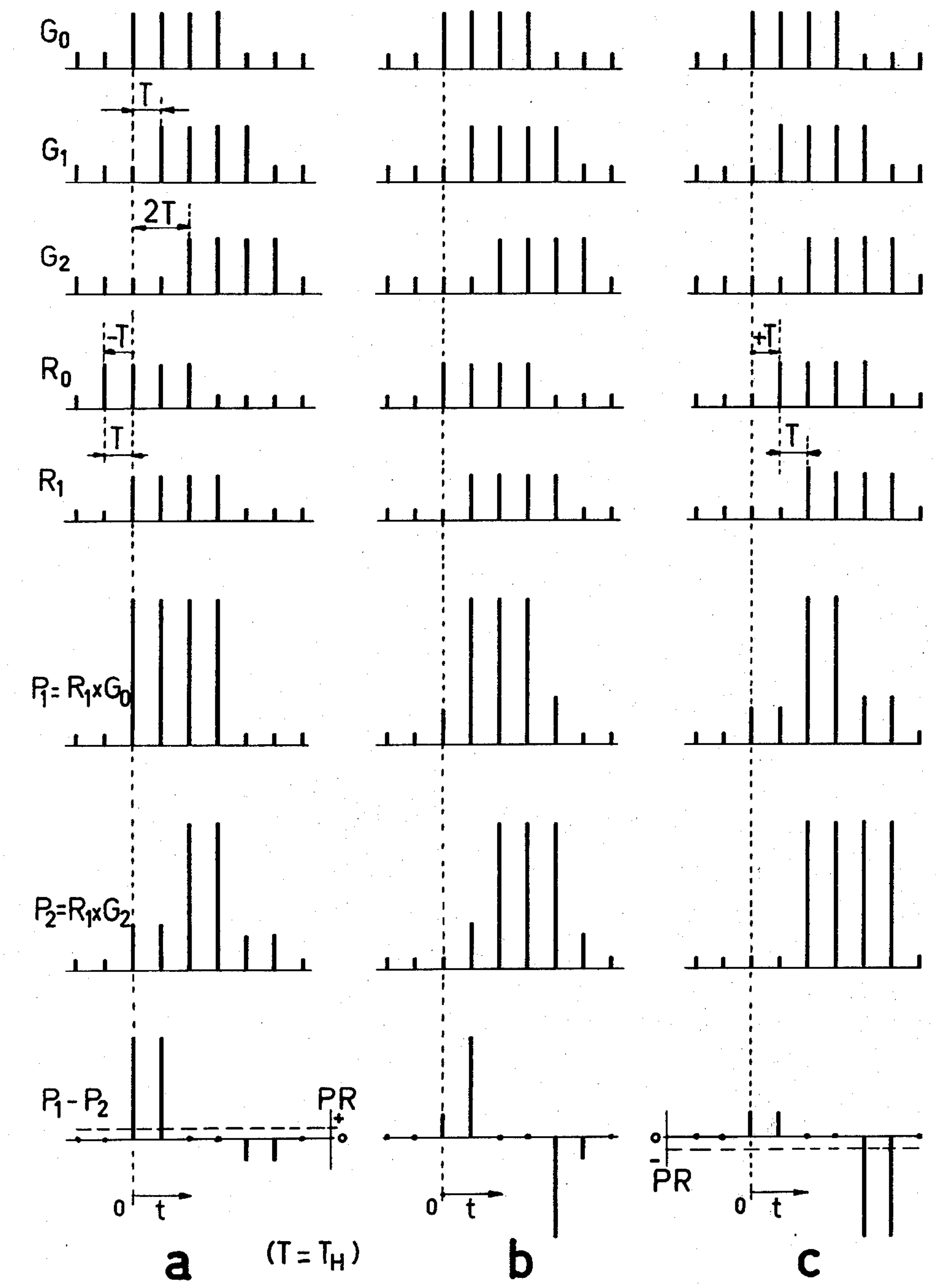
Figure 4:
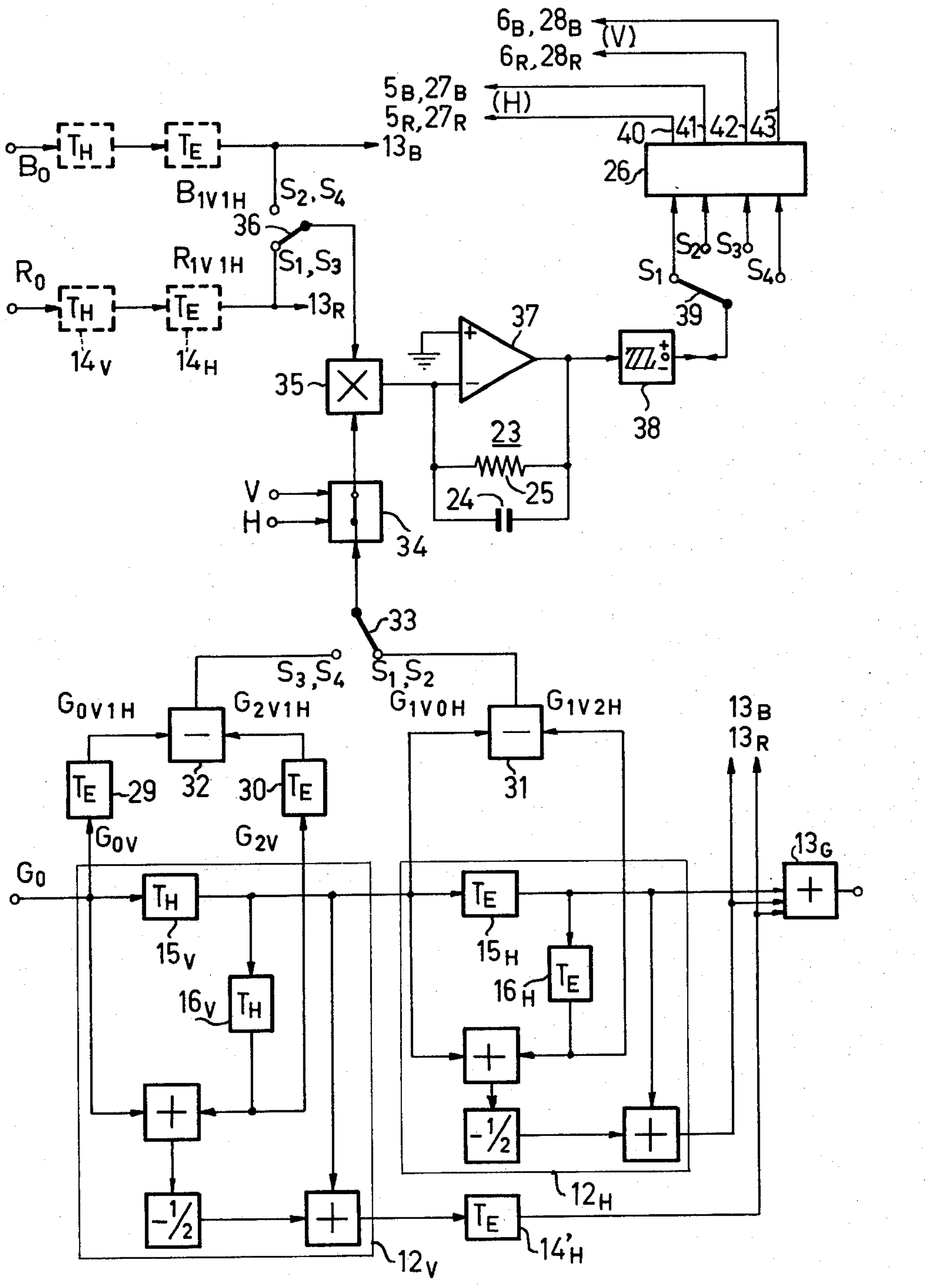

FIG. 3 shows likewise as FIG. 2 some signals associated with a correction in the field scan direction, and FIG. 4 shows a second embodiment of a raster position corrector suitable for correction in the line and field scan directions.

In FIG. 1 the reference numeral 1 denotes a scene represented by an arrow an image of which is projected through an objective lens 2 onto three camera tubes 3 denoted by $3_G$, $3_R$and $3_B$. A beam splitter 4 which is shown diagrammatically with mirrors $4_G$, $4_R$ and $4_B$ passing light of a given colour and reflecting light of a different colour is provided between the objective lens 2 and the camera tubes 3. The beam splitter 4 causes, for example, the green light coming from scene 1 to be incident on the tube $3_G$, the red light to be incident on the tube $3_R$ and the blue light to be incident on the camera tube $3_B$ which is shown in FIG. 1 by G, R and B.

In the camera tubes 3 the reference numerals 5 and 6 with G, R and B as indices denote deflection means for deflecting an electron beam (not shown) generated in each of the camera tubes 3. To this end the deflection means 5 and 6 formed with coils connected to ground are connected to a line deflection generator 7 and a field deflection generator 8, respectively. Line deflection generator 7 provides a square-wave voltage (u) under the control of a line synchronizing signal H which voltage provides a sawtooth current in the line deflection coil $5_{G,\ R,B}$ through a capacitor $9_{G,R,B}$. Field deflection generator 8 provides a sawtooth current (i) under the control of a field synchronizing signal V, which current flows via an amplifier $10_{G,R,B}$ through the field deflection coil $6_{G,R,B}$. The result is that a scanning raster is constituted by the electron beam in each of the camera tubes 3 so that the camera tubes 3 each generate an image signal corresponding to the scene 1 and apply this signal for further processing to amplifiers $11_{G,R,B}$.

Instead of a colour television camera formed with three camera tubes 3, a camera using one camera tube 3 including three scanning rasters may alternatively be used.

Amplifier $11_G$ is connected to a so-called aperture corrector 12 two outputs of which are connected to the inputs of a superimposition stage shown as an adder $13_G$. The output of the aperture corrector 12 conveying an aperture correction signal is also connected to two adders $13_R$ and $13_B$ further inputs of which are connected through delay circuits $14_R$, $14_B$ to the amplifiers $11_R$, $11_B$, respectively. Aperture corrector 12 serves for enhancing details in a reproduced scene 1 which details fade due to dispersion of light in the objective lenns 2 and beam splitter 4 and due to the finite diameter of the electron beams providing the scanning rasters in camera tubes 3.

Aperture corrector 12 is formed in known manner and includes two delay circuits 15 and 16. An undelayed signal $G_0$ and a signal $G_2$ delayed twice are applied to an adder 17. The output signal from adder 17 is applied through a signal inverter and divide - by - two circuit 18 to an adder 19 to which also a signal $G_1$ delayed once is applied. Adder 19 applies the aperture correction signal to the adders 13.

In the delay circuits 15, 16, $14_R$ and $14_B$ the reference T denotes a given delay period. T is equal in one image spot period ($T = T_E = 150$ ns in FIG. 2) for a correction in line scan direction, i.e. the horizontal aperture correction and is equal to one line period ($T = T_H = 64$ ns in FIG. 3) for a correction in the field scan direction, i.e. the vertical aperture correction. Vertical and horizontal aperture corrections may be performed simultaneously by using corrector 12 shown in FIG. 1 for the vertical aperture correction and by incorporating a horizontal aperture corrector therein to which the signal $G_1$ is applied, while the horizontal aperture correction signal is applied to the adders 13 in a manner not shown in FIG. 1 but shown in FIG. 4.

In a practical embodiment of the camera the delay circuits $14_R$ and $14_B$ are not present as such, but the camera tubes $3_R$ and $3_B$ themselves provide the delayed signals because the scanning raster in these tubes is shifted relative to that in tube $3_G$. As compared with the electron beam landing spot in the camera tube $3_G$ the landing spots in tubes $3_R$ and $3_B$ for a corrector 12 for the horizontal aperture correction are shifted one image spot to the left, opposite to the line scan direction and for a corrector 12 for the vertical aperture correction they are shifted one line upwards, that is to say, opposite to the field scan direction.

Corrector 12 is not only used for performing the horizontal and/or vertical aperture correction but can also be used for another purpose, namely for a position correction between two scanning rasters. The scanning rasters occurring in the camera tubes 3 frequently do not satisfactorily register, as is required. When displaying image signals three partial images distinguishable by discolorations may appear due to incorrect registering instead of one image correctly representing the scene 1. Scanning rasters which do not register may be due to differently varying adjustments and temperatures in the respective deflection means 5 and 6.

FIG. 1 shows a camera in which the scanning raster in camera tube $3_G$ is taken as a reference and to which the position of the scanning rasters in the tubes $3_R$ and $3_B$ is adapted. To clarify the position correction only one position corrector is described in conjunction with the signals in FIGS. 2 and 3, namely the position corrector associated with the camera $3_R$ conveying an undelayed image signal $R_0$ and an image signal $R_1$ delayed once with aid of delay circuit $14_R$.

The signals shown as a function of time $t$ in FIG. 2 are associated with a position correction in the line scan direction in which the aperture corrector 12 provides for the horizontal aperture correction ($T = T_E$). The square-wave pulse having a duration of aT in signal $G_0$ is associated, for example, with a bright vertical bar in the scene 1 in a comparatively dark area. Signal $R_0$ in FIG. 2*b* shows that the slopes of a square-wave pulse occurring therein coincide with those in the signal $G_0$. If the pulse is present in the considered signals $R_0$ and $G_0$ only is not present in the signal $B_0$, a yellowish bar appears upon display, which bar likewise occurs in the scene 1. Starting from this yellowish bar in scene 1 it is found that upon display of the signals $R_0$ and $G_0$ shown in FIG. 2*a* and 2*b* the bar has a red and a green edge on either side. The pulse in the signal $R_0$ occurs in FIG. 2*a* at an earlier instance than in signal $G_0$ (period $t$ $b_1$T). The opposite applies to the pulse in the signal $G_0$ in FIG. 2*c* which pulse occurs a period $+b_2$T later. The signals in FIG. 2 *a* and 2*c* are associated with scanning rasters in the camera tubes $3_G$ and $3_R$, which rasters are not correctly positioned in the horizontal (line) direction.

A consideration similar to that in FIG. 2 applies to FIG. 3 with the difference that a position correction is to be effected in the vertical (field) scan direction in FIGS. 3*a* and 3*c* and that the aperture corrector 12 provides for the vertical aperture correction ($T = T_H$). The signals in FIG. 3 are associated with a horizontal, yellowish bar in the scene 1 while in the signal shown in instantaneous value occuring during one line period is used.

For performing the position correction signal $R_1$ according to FIG. 1 is applied to two signal multipliers $20_R$ and $21_R$ to which the signals $G_O$ and $G_2$ are applied as second signals for the purpose of multiplication. The multiplier $20_R$ applies a signal $P_1 = R_1 \times G_O$ and multiplier $21_R$ applies a signal $P_2 = R_1 \times G_2$ to a subtractor stage $22_R$ which provides a signal $P_1 - P_2$. FIGS. 2 and 3 show these signals. Subtractor stage $22_R$ is connected to an integrator $23_R$ which includes a resistor 25 and a capacitor 24 to ground. The integration of the signal $P_1 - P_2$ to be considered as the error signal and being performed by integrator $23_R$ results in an integrated error signal PR.

In the case described with reference to FIG. 2*b* and 3*b* signal PR has the zero value, in FIG. 2*b* because of a positive and a negative pulse of the same duration and in FIG. 3*b* because identical negative pulses occur for a plurality of positive pulses having different amplitudes. Integrator $23_R$ then does not provide any signal.

In the case described with reference to FIGS. 2*a* and 3*a* integrator 23R provides an integrated error signal PR having a positive level because the positive pulses has a longer duration and because the positive pulses have a higher amplitude than the negative pulses. In the case described with reference to FIGS. 2*c* and 3*c* signal PR has a negative level.

A period of approximately five field periods in an interlaced television system can be chosen as a time constant of the integrator 23 used for a correction in the horizontal or vertical direction, while, for example, for resistor 25 a value of 275 kΩ and for capacitor 24 a value of 0.2 μF is used.

The integrated error signal PR is applied to a store $26_R$ which is provided with, for example, a threshold level. Store $26_R$ consequently follows the level in the signal PR when this level differs therefrom by more than the threshold level.

For performing a position correction in the line scan direction (FIG. 2) store $26_R$ is connected to a level control $27_R$. Dependent on the value of signal PR stored in store $26_R$ level control $27_R$ applies a given direct current (i) to the junction of capacitor $9_R$ and the horizontal deflection coil $5_R$.

When a position correction illustrated by the signals in FIG. 3 is performed in the field scan direction, store $26_R$ is connected to a level control $28_R$. Dependent on the value of the signal PR stored in store $26_R$, level control $28_R$ applies a given direct control voltage (u) to amplifier $10_R$ so that the direct current level in the sawtooth-shaped field deflection current is determined for deflection coil $6_R$.

The colour television camera according to the invention has the great advantage that the raster position corrector which comprises in principle the components 14 to 28 inclusive is formed as little as possible with its own components. In fact, the components 14 to 19 inclusive are present for the aperture correction and are additionally utilized for the raster position correction. Consequently components 20 to 28 inclusive are left as the own components of the raster position corrector. Especially this dual utilisation of the expensive delay circuits 15 and 16 having a delay ($T = T_H$) over one line period is advantageous. As is stated with reference to the description of the aperture correction, the delay circuits $14_R$ and $14_B$ may be absent when the tubes $3_R$ and $3_B$ themselves provide a signal which its delayed relative to the tube $3_G$.

FIG. 4 shows a raster position corrector suitable for correction in the line and field scan directions. Reference numerals shown in FIG. 2 are similarly used in FIG. 4. The indices V and H denote components which are important for the correction in the field and line scan directions, respectively. Reference $12_V$ denotes a vertical aperture corrector and a corrector for the horizontal aperture correction is denoted by $12_H$. Delay circuits $15_V$ and $16_V$ having a delay period of one line period TH and delay circuits $15_H$ and $16_H$ having a delay period of one image spot period $T_E$ are provided. The references $14_V$ and $14_H$ at signal $R_O$ denote the delay circuits which are present or absent. Reference $14'_H$ denotes a delay circuit which ensures that the vertical aperture correction signal provided by aperture corrector $12_V$ is received by the adders 13 with a delay period of $T_E$. All this has been introduced for the purpose of compensation of the delays brought about by the delay circuits $15_H$ and $14_H$.

Aperture corrector $12_H$ provides the signals for the position correction in the line scan direction in which the delays are denoted by indices such as at $G_{1VoH}$ and $G_{1V2H}$. Since the signals $R_{lUlH}$ and $B_{1V1H}$ are available for the position correction in the field the line scan directions, the signals $G_{oV}$ and $G_{2V}$ provided by the vertical aperture correction signal provided by aperture corto be delayed over one image spot period $T_E$ in order that the signals $G_{oV1H}$ and $G_{2V1H}$ are obtained. To this end two delay circuits 29 and 30 are provided which ensure that image spots located right above one another are used for the position correction in the vertical direction.

The signals $G_{1VoH}$ and $G_{1V2H}$ are applied to a subtractor stage 31. The signals $G_{oV1H}$ and $G_{2V1H}$ are applied to a subtractor stage 32. The output signals from subtractor stages 31 and 32 may be chosen through a selection switch 33 and may be applied through an on-off switch 34 to a multiplier 35. A further input of multiplier 35 receives the signal $B_{1V1H}$ or $R_{1V1H}$ through a selection switch 36. The output of multiplier 35 is connected to an inverse input of a differential amplifier 37, the other input of which is connected to ground. The integrator 23 including capacitor 24 and in parallel therewith the resistor 25 is located between the inverse input and the output of the differential amplifier 37. The output of the integrating amplifier (37, 23) is connected to a threshold level circuit 38 which is connected through a selection switch 39 having four contacts $S_1$, $S_2$, $S_3$ and $S_4$ to four inputs of a store 26. Store 26 has four outputs 40, 41, 42 and 43 which are connected to the level control circuits $27_R$, $27_B$, $28_R$ and $28_B$.

Starting from the switching order on the contacts $S_1$ ... $S_4$ of switch 39 the associated switch positions are shown in a cycle for the contacts of switches 33 and 36. For positions $S_1$ shown in FIG. 4 the following applies:

The output signal from stage 31 is applied to multiplier 35 through the switch 34 which is closed during a line portion of a plurality of lines located together in a field. Switch 34 which is controlled by the field and line synchronizing signals V and H thus selects a given area in the scanning raster in which the raster position corrector is operative. Since satisfactory registering of the scanning rasters is especially important in the central region of the rasters, for example, this region has been chosen.

The signal $R_{1V1H}$ is also applied multiplier 35. When switch 35 is closed, multiplier 35 provides a signal which is denoted by the signal $P_1$–$P_2$ in FIG. 2. Instead of the two multipliers 20 and 21 in FIG. 1 followed by the subtractor stage 22, one multiplier has been economised in FIG. 4 due to the choice of, firstly, subtraction in the stage 31 and, subsequently, multiplication in the single multiplier 35.

The output signal from multiplier 35 acts on the threshold level circuit 38 through the integrating amplifier (37, 23). The signal occurring on the contact $S_1$ of store 26 is compared in circuit 38 with the signal coming from amplifier 37. When the difference between the two signals exceeds one of the thresholds in circuit 38 denoted by + and −, circuit 38 passes new value provided by amplifier 37 to the store 26 for the purpose of storage.

It is found that in the positions $S_1$ of switches 33, 36 and 39, store 26 receives the information for the position correction in the line direction for the camera tube $3_R$. Position S1 is maintained for a number of field periods, for example, ten periods and at the end thereof the new position correction information becomes available at the output 40 connected to the level control circuit $27_R$ with the aid of a pass-on signal in the digital store 26. The information remains at output 40 until it is modified in the described manner after some time in the cycle of the four positions $S_1$ ... $S_4$.

The change-over of switch 39 from contact $S_1$ to $S_2$ is accompanied by a change-over of switch 36 to position $S_2$, while switch 33 remains in the same position. It is evident that in position $S_2$ the raster position corrector according to FIG. 4 is operative in the line scan direction (switch 33) and this for adapting the signal $B_O$ (switch 36). Before the end of position $S_2$ in the cycle the new raster position correction in the line direction occurs at the output 41, which correction is modified or not modified relative to the previous correction.

When changing over switch 39 to contact $S_3$, the two switches 33 and 36 also change over. In position $S_3$ as well as in position $S_4$ switch 33 causes the position correction to take place in the field scan direction. In position $S_3$ switch 36 causes the signal $R_O$ to be adapted under the influence of the correction signal at the output 42 of store 26, while this is effected in positions $S_4$ for signal $B_O$ under the influence of the correction signal at output 43.

The embodiment of the position corrector according to FIG. 4 clearly shows that there is no difference between the correction in the line and field scan directions, with the advantage that the use of switch 33 considerably economises the own components 23 to 43 inclusive of the position corrector.

The use of integrator 23 or the integrating amplifier (37, 23) leads to a position correction performed statically with the aid of a direct current from the level control circuits 27 or a direct voltage from the level control circuits 28. As is shown in FIG. 4 the correction direct currents and direct voltages are only to be modified once during dozens of field periods, for example, 60 field periods. Such a static correction is especially important for the line deflection coils 5 which have a highly inductive character and in which it is undesirable to introduce currents and voltages having a variation exceeding the line frequency.

The switch 34 shown in FIG. 4 may be provided in FIG. 1, for example, between the delay circuit $\mathbf{14}_R$ and the multipliers $\mathbf{20}_R$ and $\mathbf{21}_R$.

What is claimed is:

1. A circuit for registering a first scanning raster onto a second scanning raster, said circuit comprising a position corrector means having a pair of inputs for receiving video signals representative of said rasters respectively and an output means for supplying an error signal in accordance with any differences in registration between said rasters; means for eliminating high frequency components from said error signal comprising an integrator having an input coupled to said output means, and an output, and having a time constant at least substantially equal to one field period; and a store having an input coupled to said integrator output and an output means for applying a signal to a deflection means whereby said registration is performed without high frequency distortion.

2. A circuit as claimed in claim 1 wherein said position corrector comprises switching means having an input means for receiving a line and field synchronization signal for switching on said position corrector during a selected portion of one of said scanning rasters.

3. A circuit as claimed in claim 1 wherein said corrector means comprises a pair of delay circuit means each having an input means for receiving one of said video signals and an output means for providing one of said video signals once and twice delayed respectively, and a series circuit coupled between said delay means output means and said integrator and including at least one multiplier means and at least one subtractor means coupled to said multiplier.

4. A circuit as claimed in claim 3 further comprising an aperture correction means comprising said delay means.

5. A circuit as claimed in claim 3 wherein said subtractor means comprises a pair of input means coupled to said pair of delay means respectively for receiving said one signal and said one signal twice delayed respectively, and said multiplier means comprises a first input means for receiving said other video signal, a second input means coupled to said subtractor, and an output coupled to said integrator.

6. A circuit as claimed as in claim 3 wherein said position corrector means comprises a vertical aperture correction means and a horizontal aperture correction means, each of said aperture correction means supplying an undelayed and twice delayed signal, and means having an input coupled to said vertical aperture correction means to receive a combination signal of said twice delayed and undelayed signals and an output means for supplying said combination signal delayed by a period equal to the delay period of said horizontal aperture correction means.

7. A circuit as claimed in claim 6 wherein said position corrector comprises two subtractor means having two pair of inputs coupled to said vertical and horizontal aperture correction means respectively, and a pair of outputs and a switch having two inputs coupled to said subtractor means outputs respectively and an output coupled to said multiplier.

* * * * *